Fig. 5

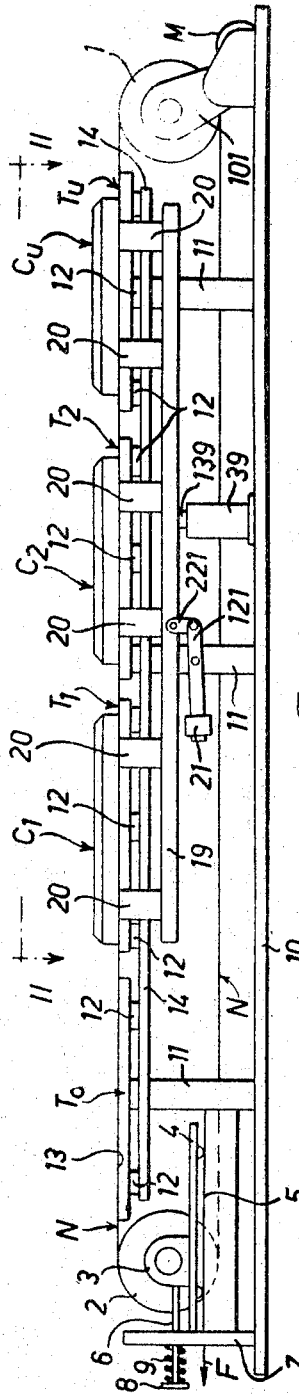

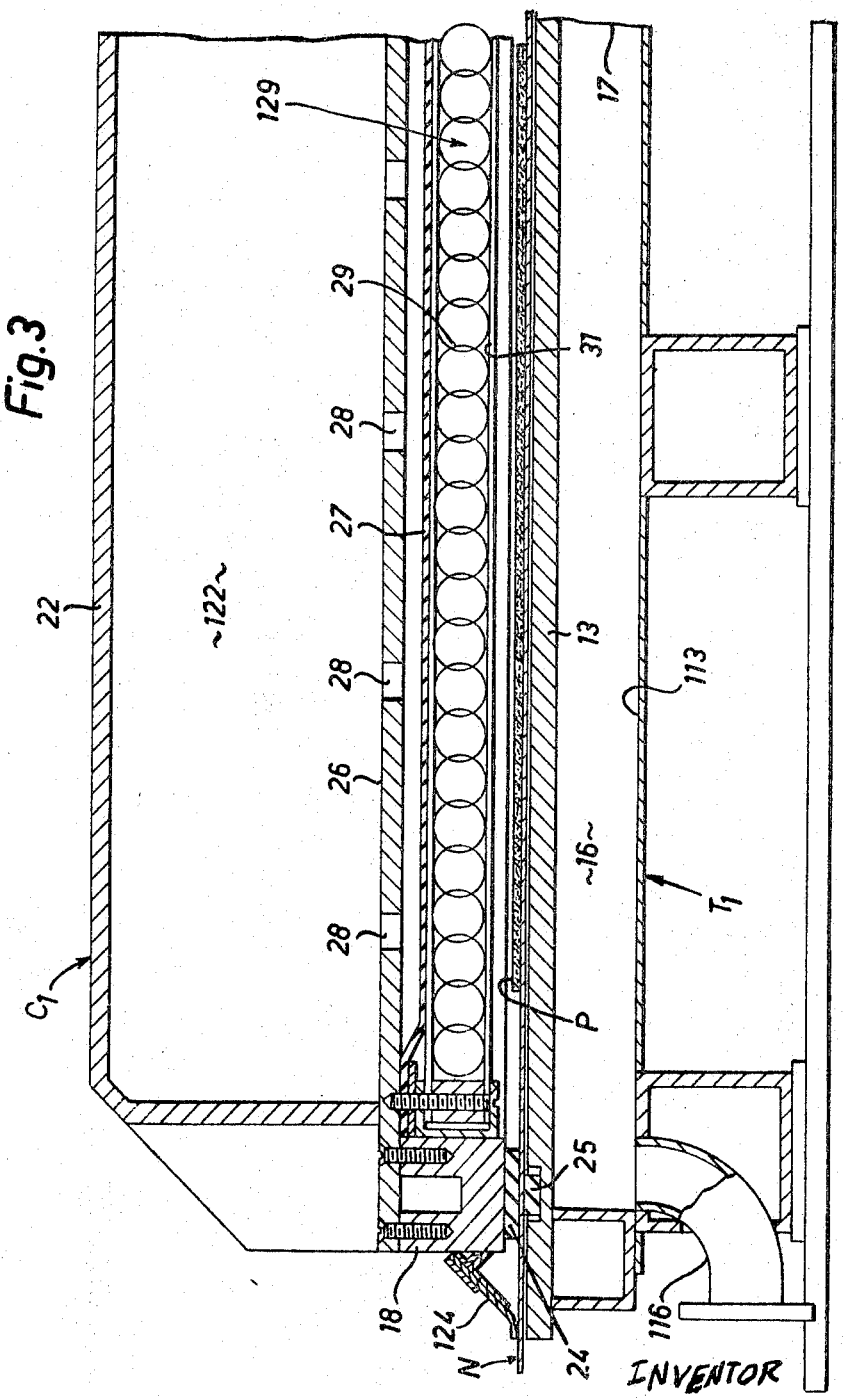

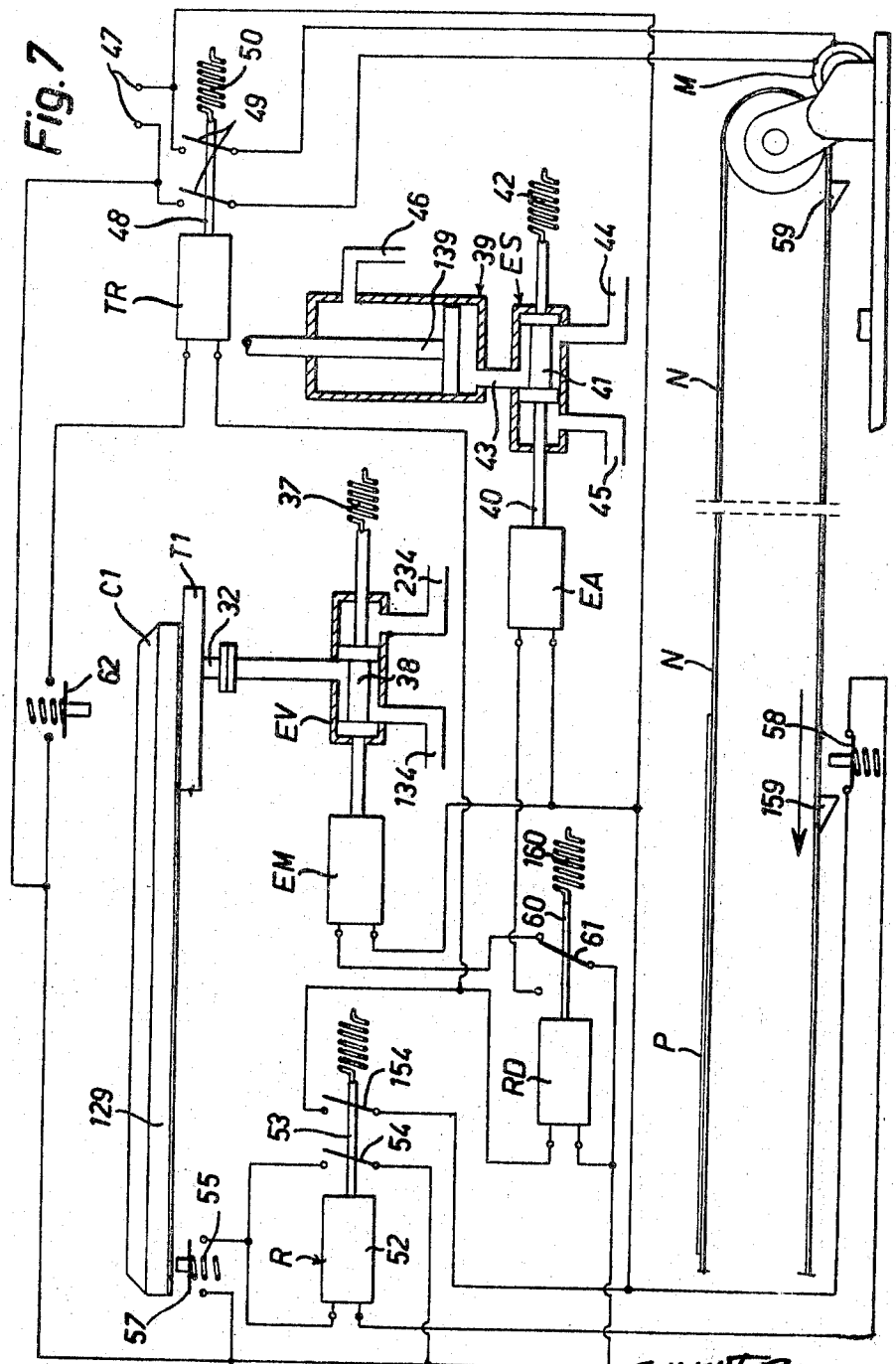

3,321,842
PROCESS AND MEANS FOR THE STEPWISE DRYING UNDER VACUUM AND SUCCESSIVE CONDITIONING, IN A CONTINUOUS OPERATION, OF TANNED SKINS AND THE LIKE
Paolo Bocciardo, 39 Via Canevari, Genoa, Italy
Filed Oct. 14, 1965, Ser. No. 496,099
Claims priority, application Italy, Nov. 6, 1962, 693,257;
Sept. 20, 1965, 21,338/65
16 Claims. (Cl. 34—15)

This application is a continuation-in-part of my U.S. patent application Ser. No. 273,512, filed Apr. 16, 1963.

This invention relates to a process and means for the stepwise drying under vacuum and successive conditioning, in a continuous operation, of wet tanned skins, hides and leather-like material—which shall be shortly included in the term skins.

Apparatus for drying tanned skins or the like under vacuum are known in the prior art. Among these apparatus there may be mentioned those comprising a lower fixed heat-conductive or metallic plate, upon which the skins are "slicked out" or "spread out" while said plate is heated from below, and a cover, provided with means for keeping the skins spread out upon the said plate and adapted to be connected to a source of vacuum for facilitating the evaporation of moisture from the skins.

The major drawback of the prior art constructions is that the apparatus are not suited for continuous operation and must operate at fixed temperatures and under the action of a fixed vacuum source. In practice, however, it would be convenient to subject the skins to be dried to the action of higher temperatures and of less vacuum at the beginning of the drying operations, and to a most moderate heating and to higher vacuum levels by the end of the drying operation.

Furthermore, the skins, when removed in dried condition from prior art apparatus, do not have a uniform moisture content throughout their thickness, because the skin side which has been directly subjected to the action of the heating source comes to be excessively dry while the opposite side has an excessive moisture content. Under these circumstances, in order to have saleable leather, the dried skins are usually piled up for days for conditioning, until the moisture contents has become equal throughout the leather thickness.

It is therefore an object of the invention to provide an apparatus which, in addition to the continuous drying in successive steps and under vacuum, provides an additional step, by which, under different heat conditions and without vacuum, the conditioning of the dried skins is permitted in successive steps, which take place simultaneously with the preceding drying steps on subsequently fed skins. Thus in practice, in a time which is a fraction of the time employed for drying the skins under vacuum in a discontinuous process, the same skins are better and completely processed until, at the end, the skins are transformed in a very short time into leather ready for stacking and finishing operations, having been subjected also to a very quick conditioning which up-to-date has required days of conditioning of the dried skins and large treatment rooms.

The apparatus according to the invention therefore permits of drying and conditioning the skins in a plurality of stations in which the stay time may be adjusted on the basis of the time which is needed by the worker at the charging station for slicking out the skins to be dried and conditioned, and during this time the skins at the other stations are subjected to other treatments so that, at the end of one slicking operation, at the charging end of the apparatus, the skins in the last station or discharging end of the same apparatus are in form of dry conditioned leather.

Thus at the same time that the skins at the charging station are moved to the first drying station, the skins which were in the last station come out therefrom and may be removed and directly stacked.

In practice, according to the invention, the skins are slicked out at the charging station upon a section of an endless belt conveyor made of thin heat conductive material, such as stainless steel. According to the invention said endless belt conveyor, which may be made from a continuous band or from a plurality of sheets of stainless steel, hinged or otherwise connected together, is mounted in such a manner that its upper run is caused to slide upon aligned and co-planar plates and is stopped with each of its skin-carrying section or sheets in contact with either one of said plates which are heated up to the required temperatures, viz., to the temperatures which are most suitable for the drying or the conditioning of the skins. Said upper run is thus stopped in fixed positions, so that each belt section—the term section being employed for designating either a length of a continuous band or a sheet in case of an endless conveyor made up of hinged sheet sections—remains in close heat-conductive contact with said plates for the predetermined time which has been found necessary for effecting the corresponding partial treatment.

Another object of the invention is to provide a leather-drying machine in which the timing of the different drying steps may be rendered completely automatic and predetermined at the beginning of the operation, according to requirements.

According to a preferred embodiment of the invention aligned separate tables are provided which are heated from below at suitable temperatures and in contact with which the endless conveyor belt sections slide and are stopped in fixed positions. Upon said tables, in the stations beyond the first one, which is the leather "slicking out" station, a plurality of covers or pneumatic bell-like members, provided with packing strips, are lifted just before and during the belt shifting and are lowered with their edge-packing into close contact therewith, when the conveyor belt is stopped. During this stopping, in the drying stations, the upper side of said leather comes to be subjected to the action of vacuum and/or to a certain compression in a closed chamber, the floor or bottom of which is movable and is constituted by a belt section, while above the skins there acts an elastic diaphragm fastened under the cover and which is pushed against the leather by the overlying air pressure, which may be varied in a known manner by varying the amount of vacuum or also by varying a counter-pressure on its top side.

Furthermore, according to the same preferred embodiment of the invention, in the last step of the skin treatment the plate upon which the skin-carrying conveyor-belt section bears is not heated as the preceding ones, while the heat is transmitted to the skins from above, by means of a flexible membrane which is lowered into contact with the skins and acts so as to cause the moisture to migrate from the upper skin side, which is still excessively wet, towards the lower skin side, which is excessively dry, thus effecting the so-called "conditioning."

According to an embodiment of the invention, the machine may be provided with preferably electromechanical means for automatically passing from either to the following one of the several drying and conditioning steps.

Subordinately, the invention comprises a novel leather product derived from skins, hides and the like obtained by the process as outlined above.

The invention will be better understood from the following specification of one preferred embodiment of the apparatus for performing the novel process, said embodiment being shown diagrammatically and only by way of non-limiting example in the accompanying drawings, in which:

FIGURE 1 is a diagrammatical view in side elevation of a continuous machine for the vacuum-drying and conditioning of tanned skins in a plurality of successive steps;

FIGURE 2 is a slightly enlarged top plan view of the part of the machine as shown in FIGURE 1, comprised between the arrows II—II, the pneumatic covers or bells and some other parts having been removed for better illustrating other parts of said machine;

FIGURES 3 and 4 are enlarged vertical sections on lines III—III and IV—IV of FIGURE 2, through an intermediate section of a machine provided with pneumatic cover or bell;

FIGURES 5 and 6 are enlarged vertical sections on lines V—V and VI—VI of FIGURE 2, through the last section of the machine, provided with a pneumatic cover;

FIGURE 7 is a diagram of the controls, showing the realization of one of the steps of the process for automatically drying tanned skins in a plurality of steps, by employing conventional machine elements and a special electromechanical control system.

Figure 4:
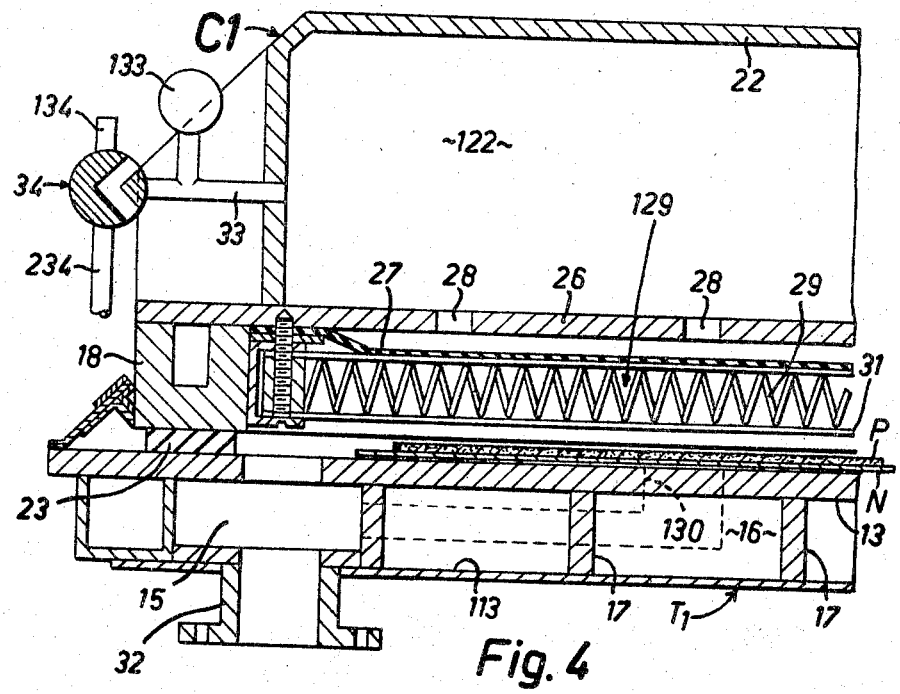

With reference to FIGURES 1 and 2, the continuous machine for the drying of skins or hides, comprises a base plate 10 having mounted thereon a plurality of columns 11 which support a rugged horizontal frame 14 on which there is mounted a number of supporting tables T0, T1, T2 . . . TU which are supported by short hollow supporting members 12.

Parallel to frame 14 and preferably below said supporting frame there is another supporting frame 19 which is wider and shorter than frame 14 and extends below said supporting tables T1 . . . TU, after the first table T0.

The supporting frame 19 is mounted for vertical sliding movement on conventional guide means (not shown) and may be lifted and lowered by piston rods 139 of a pair of hydraulic cylinders 39 (one of which is visible in FIGURE 1). The weight of said frame 19 (and of the parts supported thereby) may be balanced by counterweights 21 (only one of which is visible in FIGURE 1) carried by balance levers 121 connected by means of linked rods 221 to said frame 19.

Upon frame 19 there is mounted a number of vertical supporting members 20 arranged in such a manner as to be capable of sliding vertically without interfering with the sides of the overlying frame 14. Upon said supporting members, in correspondence of each table T1, T2 . . . TU, a cover member C1, C2 . . . CU is fastened. The covers, as will be better seen hereinafter, usually function as pneumatic bells.

The tables T0 . . . TU are hollow and provided at their tops with a smooth metallic plate 13. These plates 13 are separated, but co-planar, and aligned and upon the same there bear smooth sections of the upper run of endless conveyor belt N which is moved for a predetermined length under the covers C1 . . . CU when they are lifted. As appears from the drawings, on the first table T0 there is no cover, while the table TU which is the last of the set of tables (and in the case as shown, it is the fourth, but it could be also the 3rd, the 5th or some other) is provided with a cover CU which is different from the other ones, as will be better seen hereinafter.

The endless conveyor belt N, which may be also made of adjoining sections NS connected by hinges H, is made preferably of thin stainless steel sheet or other heat-conductive and corrosion resisting material and is entrained by a driving roll 1 driven by motor M through a suitable step-down gear and coupling housed in box 101, and is maintained tensioned by tensioning roll 2 mounted upon a carriage 4 through the medium of bearings 3. Carriage 4 is shiftable on guide rails 5 supported by base 10 and is pulled towards the corresponding end of the machine by a draw bar 6 which is fastened to a part of carriage 4 and is urged in the direction of arrow F by a spring 9 which is compressed between the head 8 of the free end of the draw bar 6 and a fixed abutment upright 7.

Tables T0 . . . TU and covers C1 . . . CU may be of any conventional or special type, of the kind usually employed in apparatus for the drying of skins and hides under vacuum.

Figure 6:
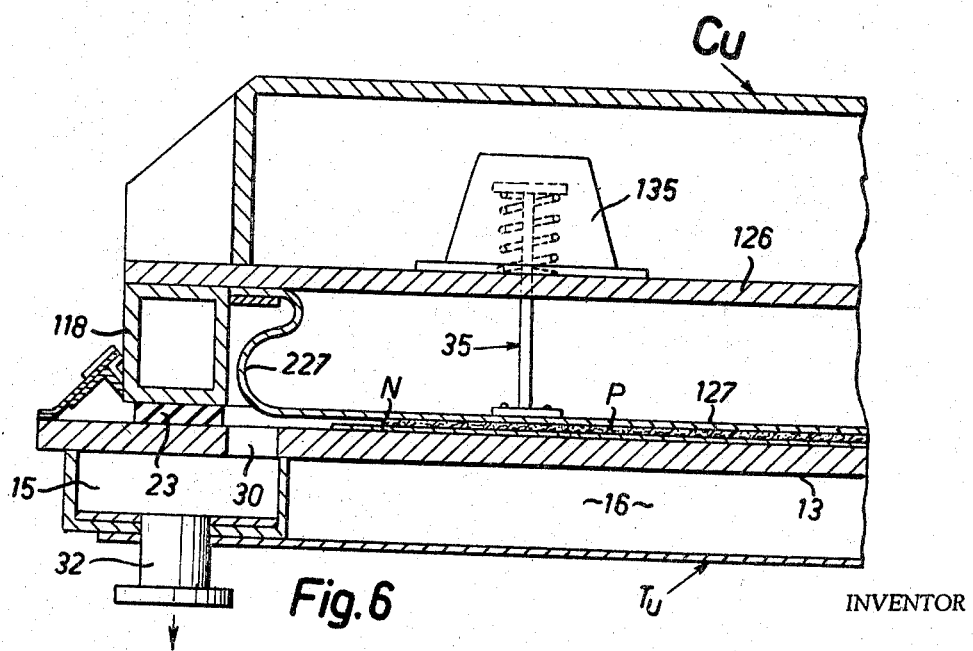
Figure 5:
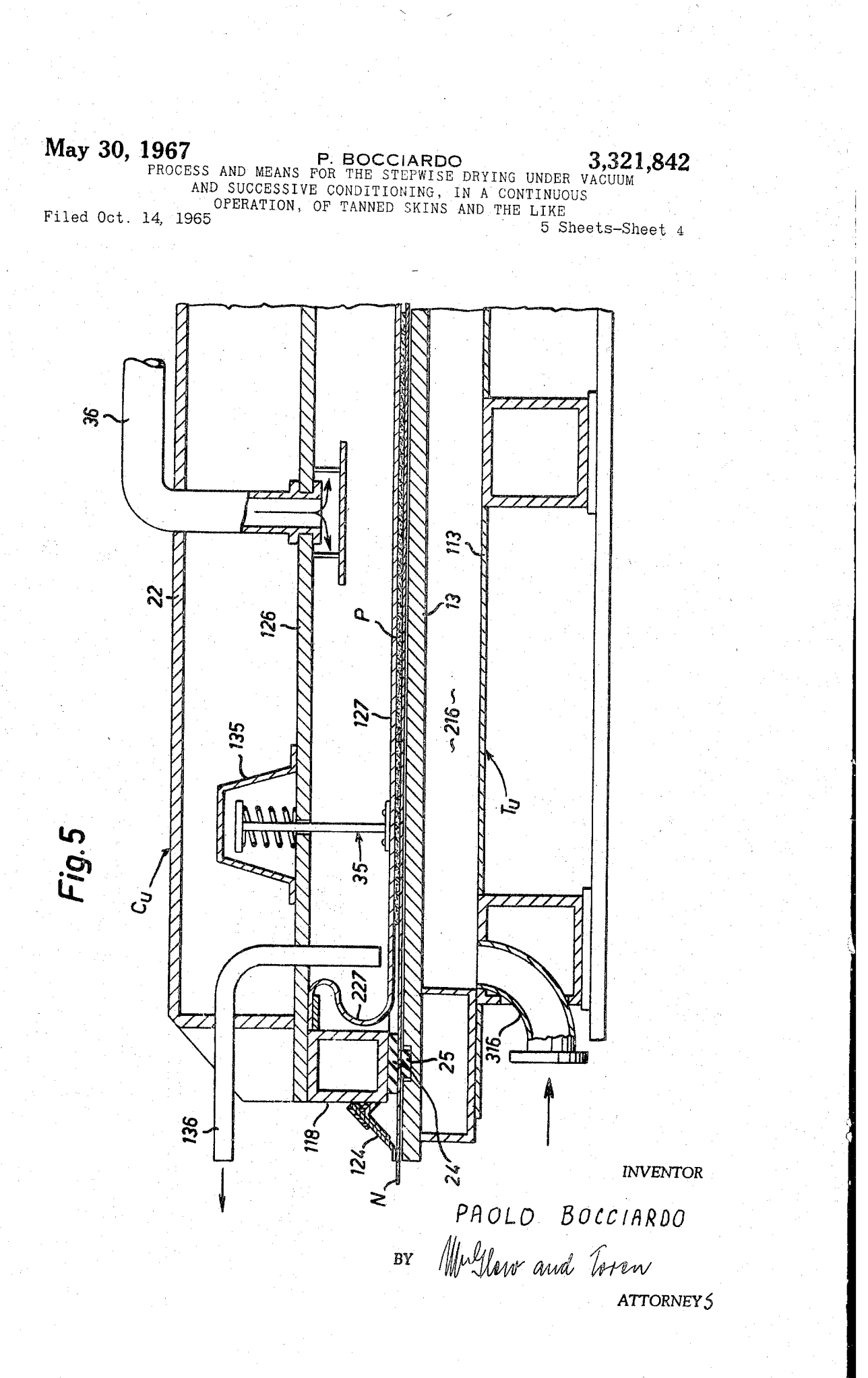

With reference to FIGURES 3 through 6 of the drawings, each box-like table T comprises an upper supporting plate 13 having a smooth surface and a lower box 113 tightly connnected to plate 13. This hollow or box-like part 113 comprises a pair of lateral ducts or mains 15 (see FIGURE 2) and a wide central chamber or jacket 16, which may be provided at the interior with baffle plates 17 forming a kind of labyrinth for the fluid.

The side parts of plates 13, which constitute the top walls of the lateral mains 15, are provided with holes or ports 30 while the central parts of plates 13, which constitute the plane upon which the belt N bears, are not perforated, although in some cases additional suction ports 130 (see FIGURES 2 and 4) may be provided beneath the belt N, in order to cause the said belt to adhere more closely by suction to the top plate of the tables T0 . . . TU.

Mains 15 are connected by means of pipings 32 to a vacuum source (a vacuum pump, not shown, and preferably also a vacuum accumulator), while the jackets 16 are connected through independent tubular ducts 116 to a source of heating or of cooling fluid (not shown). Furthermore outlets 516 (FIGURE 2) are provided for the exhausted fluid and possibly of condensate water from jackets 16.

Above the top plates 13 of said tables the covers C1 . . . CU may be lifted and lowered.

Also these covers, and particularly those before the last cover CU (see FIGURES 3 and 4), are known in the art of the vacuum-drying of sheet material, and particularly of skins or hides, and they comprise particularly a hood-like member 22 closed downwardly by a rigid base plate 26 provided with holes 28. Upon the peripheral edge of plate 26, bearing and packing members are fastened, such as the peripheral frame 18, FIGURES 3 and 4 or 118, FIGURES 5 and 6. This frame carries, at its lower side, longitudinal packing strips 23, FIGURES 4 and 6, for effecting the longitudinal tightness against the plate 13, beyond the vacuum ports 30, and also transversal packing strips 24, FIGURES 3 and 5, and also free peripheral packing laps or tongues 124 for ensuring a tight seal against belt section N which remains in close contact with plate 13. In correspondence with said packing strips 24, under the belt section N, other packing strips 25 are inserted in longitudinal grooves of top plate 13.

Upon the lower side of base plate 26 of covers C1, C2 . . . a flexible and impermeable membrane 27, made of India rubber of like material, is fastened peripherally, by its edges.

Below membrane 27 there is fastened by its edges a large-meshed network 29, which serves as flexible spacing member designed for forming a chamber 129 and through which the suction which is applied through the ports 30 generates in the said chamber a vacuum which diffuses itself above the skins P on the belt section N. In order to avoid that the spaced metallic wires of the lower net part remain visibly impressed on the skin, when said net is pressed thereagainst by the pressure of the air acting upon the membrane 27, a thick smooth sheet 31 of a permeable material such as felt, tissue or the like, is fastened under the net 29.

The inside space 122 of the covers C, above membrane 27, communicates with the exterior through a short piping 33 provided with a vacuum gauge 133 and also provided with a two-way cock 34 which may be put alternately into communication with the atmosphere (pipe 134) or with a source of vacuum (pipe 234). In this manner it is possible to adjust at will the pressure acting upon the membrane 27.

The last cover CU, FIGURES 1, 2, 5 and 6 is like, at its exterior, to the preceding ones. It is closed downwardly by a plate 126, under which there is fastened, at its periphery, a flexible heat-transmissive sheet 127, fastened by its edges through a bellows-like connection 227. The flexible sheet or membrane 127 is further suspended by its central part by means of spring suspensions 35 comprising a rod which slidably passes through plate 126 and is inserted under a cap 135 tightly welded to plate 126. A pipe 36 for feeding steam or other heating fluid is led through cover 22 and plate 126 and opens in the space between said plate and the membrane 127, a second pipe 136 opening also in said space being provided for discharging to the exterior the exhausted steam.

In the jacket 216 of table TU there is fed through duct 316 a suitable cooling fluid.

The operation of the just-described machine will be now described with particular reference to FIGURES 1 and 2 of the drawings. Assume the machine to be in the position as shown in FIGURE 1, with the belt N stopped, and that the tables have been heated to the required temperature (which is usually decreasing) by the steam or other fluid circulating through their jackets. The worker spreads out a wet skin upon the belt section N above table T0, whereafter a suitable fluid under pressure is fed into the cylinders 39. This effects the upward shifting of rods 139 connected to the pistons housed within cylinders 39, and consequently effects lifting of the frame 19 on which the covers C1, C2 ... CU are mounted.

When the covers have been sufficiently lifted, the motor M, which drives the belt N, is started and the belt N is caused to progress in the direction of the arrow A for such a length as to bring the skin which had been previously spread out upon the belt section N which was upon table T0, above the same belt section which is now upon table T1. Now the fluid under pressure is allowed to flow out of the cylinders 39 and thus frame 19 is lowered by its own weight, until the covers come again to tightly bear above tables T1, T2 ... TU. Then the mains 15 formed in the longitudinal sides of said tables T are connected to the vacuum source which, by acting also from below belt N, promotes the strong adherence of the corresponding section to the underlying table T1 or to the following ones, so that the leather pieces which come to be under the covers C1, C2 in the corresponding treatment stations come to be dried under the combined action of the heating and suction. It is to be noted that, in practice, the heating is so adjusted as to be a maximum when the leather comes to be upon the belt section N on table T1, while it is less on table T2 (and possibly in the following ones), while the suction under the corresponding covers C1, C2 generally (but not necessarily) is increasing and, if necessary, the pressure above the membrane 27 is also reduced by connecting the chamber 122 under the cover with a vacuum source.

The drying of the skins is not carried out in each station, until they are completely dried, but is stopped at a certain degree, which is a function of the number of the drying stations. Thus, for example, assuming that there are two drying stations, as in the case as shown in FIGURE 1, the drying is prosecuted in each station for a time which substantially corresponds to one-half of the total time required for the drying of each skin, so that after the first half of this time the skin which comes to be on the belt section N on table T1 and under the cover C1 is transferred, without removing same from said belt section, to the station upon table T2 and under the cover C2, while a fresh skin, which in the meantime had been spread out upon the belt section N at the station T0, is transferred to the station T1–C1.

By operating in this manner and by suitably choosing the number of the intermediate treatment stations, the different drying temperatures and vacuums, the dead working times may be reduced almost to nil so that the machine may be operated so as to dry one skin during the time which is strictly necessary for spreading out a wet skin upon the belt section in correspondence of the station above table T0. The dried skins may then pass to a subsequent conditioning station between the table TU and cover CU, where they are subjected to a heating from above, while in the underlying table TU circulates a cold fluid. In this manner a uniform equalization of the residual moisture throughout the while skin is effected, after which the skin is discharged out of the machine in the form of leather ready for stacking and/or finishing.

Of course, each step or advancing movement is, respectively, preceded and followed by a lifting and lowering of the covers C, in the above described manner, whereby at the moment of each lifting of the covers, the suction through the mains 15 is stopped and said suction is reinstated each time said covers have been again lowered upon the respective tables T.

The above described operations of the machine may be controlled by hand or by means of conventional control means. It is however possible and advantageous to control such operation in a completely automatic manner. To this purpose, according to a further preferred embodiment of the invention, an electric control circuit has been devised which permits the complete automatization of the described machine.

This circuit is particularly shown in FIGURE 7 and to this figure reference will be mainly made when describing the control circuit of the machine.

In FIGURE 7, it has been assumed that the belt N is stopped and that a skin P to be dried, which had been spread out upon a section of said belt N, when this section was lying on the table T0, had passed, always lying on said belt section, on table T1 and under cover C1 which, after said skin P has passed under it together with the corresponding belt section N, has been tightly lowered upon plate 13 of the underlying table T1.

The chamber 129 for the drying under vacuum is connected through pipe 32 to a vacuum valve EV which, in the example as shown in FIGURE 7, is a slide valve 38 pulled in one direction (towards the right-hand, in FIGURE 7) by a spring 37 and controlled by an electro-magnet EM which, when energized, shifts the slide 38 towards the left, as shown, and connects the chamber 129 of the cover C1 with the atmosphere through pipes 33 and 134, while, when it is de-energized, connects said chamber with a suitable suction source through ducts 33 and 234.

The lifting of the cover C1 is controlled hydraulically by means of units each comprising a cylinder 39 and a single-acting piston 139 and to which the fluid is fed through an electric valve ES which, for the sake of simplicity, has been shown as slide valve. This is controlled by a control electro-magnet EA through the control rod 40 which is integral of the slide 41 of said valve. To this slide also a return spring 42 is connected which acts in reverse direction of the electro-magnet EA so that, when this electro-magnet is de-energized, as in the case as shown, the cylinder is connected to a return tank (not shown) through ducts 43 and 44 while, when the electro-magnet EA is energized, the cylinder 39 comes to be connected to a tank containing a fluid under pressure (not shown) through ducts 43 and 45. Duct 46 serves for discharging the fluid towards the return tank when piston 139 has reached its uppermost position.

The motor M which drives belt N is supplied by a general potential source 47 (which, in practice, will be a usual electric current input) through a distant-control switch TR comprising a return spring 50 for the contacts 49 in the breaking direction and an electromagnet which, when energized, closes said contacts through rod 48 and thus closes the circuit of motor M.

In the circuit as shown, a relay R is included which comprises an electro-magnet 52 which, when energized, pulls rod 53 in one direction so as to close the working contacts 54–154 while, when it is de-energized, a spring 56 opens the said contacts 54–154.

The electromagnet 52 is connected to the source of current feed 47 through the working contacts 57 (which are closed by the cover C when this is lowered, while the contacts are reopened by the action of a spring 55, when the cover is lifted) and a rest contact 58 co-acting with one of a plurality of wedge-like abutment members 59, 159 . . . fastened to the conveyor belt N and which, when they pass above contact 58, momentarily open the same. Thereafter contact 58 snaps to closed position by the action of a return spring, as soon as the corresponding wedge runs past it.

As appears from the diagram of FIGURE 7, one of the contacts 54 which serve for maintaining relay R energized is connected in parallel with the contact 57, so that, when the electro-magnet 52 has been energized following the closure of this latter contact by the cover, relay R remains energized through contact 54 even when contact 57 is subsequently opened due to the lifting of cover C, as will appear hereinafter. In other words, contact 54 is a holding contact which automatically maintains energized electromagnet 52 of relay R.

Contact 54 of relay R is included in a circuit comprising the current input 47 and a time-delay relay RD at the closure. This relay contact controls a switching relay 61 through operating rod or arm 60 opposite to the action of spring 160 which tends to maintain contact 61 in the position as shown (rest position).

Time-delay relays are well-known devices in the art and therefore their description is omitted. It will be sufficient to say that, in the case under examination of a relay effecting delayed closure, contact 61 is closed (or, more precisely, is transferred from the rest position to the working position) with a predetermined delay with respect to the moment in which the energizing of the electric timing apparatus takes place, said timing apparatus being indicated by the block RD. The return of contact 61 from the working position to the rest position takes place, instead, almost instantaneously, by the action of spring 160, as soon as the feed of relay RD ceases.

In the position as shown in FIGURE 7, switch 61 closes the circuit of electromagnet EM which thus becomes energized and therefore maintains slide 38 in the position as shown, in which the vacuum chamber 129 of cover C1 communicates with the suction source through ducts 32 and 134. When after a certain delay time (the length of which is pre-determined with relation to the skin to be treated and to the nature of the treatment) the relay RD transfers, it transfers contact 61, opens the circuit of electromagnet EM and closes the circuit of the electromagnet EA. This operates the electric valve ES of the hydraulic cylinder 39 which lifts the cover C. In this manner, slide 38 of the vacuum electric valve EV is returned by spring 37 to rest position, so that chamber 129 of cover C1 is put into communication with the atmosphere through ducts 32 and 234. At the same time, as a consequence of the energizing of the electric valve ES, the piston 139 is lifted and lifts cover C which, at the end of its upward stroke, closes the working contact 62 (which is a contact which is maintained normally open for example by spring).

Contact 62 is enclosed in a circuit comprising the current input 47 and the electromagnet of the distant control switch TR. Consequently the contacts 49 are closed, thus starting the motor M which drives belt N forwards. When belt N has advanced by a pre-determined length, which approximately corresponds to the distance between two successive stations of working or treatment of the skins, the wedge 159 passes over contact 58 and momentarily opens the circuit of relay R. In this manner, the electromagnet 52 of said relay is de-energized and the contacts 54 and 154 are opened. Consequently, the time-delay relay RD and the distant control switch TR are also de-energized, thus interrupting the feed to the motor M.

On the other hand, the belt N does not stop immediately when wedge 159 opens contact 58, but goes on for a certain distance by inertia and stops, for example when the wedge-shaped abutment comes to the position 159. In this manner, contact 58 is again closed thus setting the circuit for the successive operation. Nevertheless this immediate closure of the contact does not promote a new starting of the motor M, because the distant-control switch is fed through contact 154 of relay R and said contact is opened because the same relay is now de-energized and cannot be again energized because, before its de-energizing, it was energized through its hold contact 54 which, of course, has been opened at the moment of said de-energizing.

The de-energizing of relay R is followed practically immediately by the de-energizing of relay RD, so that contact 61 returns to its rest position, thus re-energizing the electromagnet EM of the vacuum electro-valve EV, while the electromagnet ER of the electro-valve ES is de-energized. Thus the fluid under pressure ceases to act in the hydraulic cylinder 39 and the fluid returns to the return tank (not shown) through ducts 43 and 44 of the electric valve ES. Thus cover C starts again its lowering and opens contact 62.

In other words, the opening of the contact 58 will have returned the whole system to the starting position and said system will be thus ready to identically repeat the just-described cycle and this will take place when the cover C, at the end of its downward stroke, will again close contact 57.

Of course, the invention may undergo numerous changes in its realization.

Thus for example the process may be performed by suitably slicking out the skins upon suitable supporting members, entrained in a closed cycle at intermittence, through a series of chambers, provided with suitable entrance and exit doors, adapted to be tightly closed, said chambers being provided with connections with a vacuum source, while in said chambers the skins may be heated to the most suitable temperatures, which are different for each chamber, by suitable means which might be, for example, even generators of infrared rays.

The above and other changes, which are apparent to the skilled in the art, once the problem has been outlined in the manner as set out in the preamble to the present specification, will remain within the limits of the invention, as set out above and as claimed hereinafter, and the finished leather obtained at the end of the described treatment will have peculiar characteristics, so that it is thought that forms a patentable product.

I claim:

1. Apparatus for subjecting wet skins, hides or the like to plural drying steps under vacuum in plural separate stations, said apparatus comprising, in combination, a set of aligned substantially horizontal, heat-conductive and air-impervious skin supporting members; driving means connected to said members for moving said members along a path; a plurality of stationing and drying chambers positioned at uniform intervals along said path; said driving means advancing said members stepwise from one chamber to the next succeeding chamber at predetermined time intervals; a respective movable tight closure member at each chamber; means connected to each chamber and operable to maintain a preselected vacuum therein; heating means in each chamber operable to heat, from beneath, each skin supporting member then enclosed in the respective chamber; a respective elastically deformable air-pervious layer in each chamber; and means for raising and lowering said layer relative to the skin supporting member then in respective chamber.

2. Apparatus as claimed in claim 1, said apparatus comprising, after the last of the drying chamber, a further conditioning chamber into which each of said skin-supporting members may be moved and remain for substantially the same period of time as in each of the drying chambers, said conditioning chamber including means operable to cool the lower face of the skin-supporting member entering thereinto from the last skin-drying chamber, and an air-impervious heat-conductive flexible diaphragm; means for heating said diaphragm from above; means for lowering said diaphragm upon the skin-supporting member while the latter is being cooled from its lower face; and means operable to move the skin-supporting member out of said conditioning chamber simultaneously with the moving of skin-supporting members out of each preceding drying chamber and into each respective following chamber.

3. Apparatus as claimed in claim 1 in which said skin-supporting member is an endless belt conveyor including an integral band of a corrosion-resistant metal.

4. Apparatus as claimed in claim 3, in which said corrosion-resistant metal is stainless steel.

5. Apparatus as claimed in claim 1 in which said skin-supporting member is in the form of an endless belt conveyor comprising a plurality of thin flexible sheets, of corrosion-resistant metal, connected together by hinge-like means and each constituting a belt section having a length substantially equal to the length of one skin-supporting member.

6. Apparatus as claimed in claim 1, in which each of said skin-drying chambers includes a plate heatable from its lower side and upon which each skin-supporting member may be positioned to remain in heat-transfer relation, a cover-like member, with means for lifting and lowering said cover-like member, said cover-like member having a peripheral packing co-acting with parts of said heatable plate and with movable parts of said skin-supporting member for effecting a tight closure of the chamber when said cover-like member is lowered; said cover-like member further having a pervious elastically deformable layer which, when the cover is lowered, presses against the skins upon said supporting member and holds the skins pressed in stretched out condition.

7. Apparatus for subjecting wet tanned skins, hides, or leather-like material to a number of drying steps under vacuum and, thereafter, to at least one quick conditioning step in which the moisture contents of the skins is rendered uniform throughout the skin thickness, said apparatus comprising, in combination, a set of aligned, substantially heat-conductive and air-impervious skin-supporting endless belt sections of corrosion resistant sheet metal, each arranged to have a wet skin slicked out thereupon, said sections conjointly forming the upper run of an endless belt; plural separate substantially identical tables spaced uniformly along and beneath the upper run of said endless belt, said tables including top plates having a central heat-conductive surface and an area which is substantially equal to that of one of said endless-belt sections; heating means operatively associated with each of said conductive plates except the last conductive plate, and operable to heat the respective conductive plate from below; cooling means operable to cool the central portion of the last conductive plate; each of said plates, except the first and the last thereof, being formed with ports arranged laterally of the respective central surface thereof; means selectively operable to connect said ports with a source of vacuum; means operable to supply a heating fluid to the last conductive plate; plural cover-like closures, each operatively associated with a respective plate except the first plate, each closure having peripheral packing means engageable with the associated plate laterally beyond the ports therein and transversely of said belt; a respective flexible layer in the interior of each closure; means operable to lift said covers so as to keep the packing means thereof above the path of and out of contact with the said upper belt conveyor run and skins thereon; means operable to drive said belt conveyor so as to bring each of the belt sections, on which skins are slicked out, into heat-transfer contact with one of said heat-conductive plates; means operable to halt said belt sections upon said plates for a predetermined time; means operable, when said belt sections are halted upon said plates, to lower said closures into fluid-tight contact with the associated plate and the belt section thereon; means operable to maintain, in the interior of each of said closures except the last closure, a preselected vacuum; means operable to supply a heating fluid to the last closure; and means operable, at the end of said predetermined time, to lift said covers and to advance said belt conveyor by the distance between successive plates, in a repetitive cycle; whereby the skins may be slicked out on a belt section in advance of said covers and removed from the same belt section as it emerges from the last closure.

8. Apparatus for subjecting wet tanned skins, hides or leather-like material to a number of drying steps under vacuum and, thereafter, to at least one quick conditioning step in which the moisture content of the skins is rendered uniform throughout the skin thickness, said apparatus comprising, in combination, a set of aligned substantially heat-conductive and air-impervious skin-supporting sections of corrosion resistant sheet metal, conjointly forming the substantially horizontal upper run of an endless belt; a number of aligned equally spaced hollow tables under the upper run of said endless belt, said tables being thermally separated from one another and closed at their tops by a heat-conductive plate having a central surafce area substantially equal to that of one of said endless-belt sections; means for heating the interior of each of said hollow tables except the last one thereof; means for cooling the interior of the last hollow table; said tables, with the exception of the first and the last ones, having port openings laterally outside the endless belt; means operable to connect said ports with a source of vacuum; a respective cover-like closure member mounted above each of said hollow tables, each closure member having packing means extending around its lower periphery; a flexible layer disposed in each closure member, the flexible layer in each closure member except the last closure member being fluid-pervious, and the flexible layer of the last closure member being fluid-impervious; means operable to supply a heating fluid to the last closure member above the impervious layer thereof; means operable to lift said closure members so as to retract the same out of the path of the said upper belt conveyor run and skins thereon; driving means operable to drive said belt conveyor so as to bring each of the sections thereof, on which skins are slicked out, into heat-transfer contact with one of said hollow plates; means operable to halt said belt, with each section on a respective plate, for a predetermined time; means operable, during halting of said belt, simultaneously to lower said closure members into fluid-tight contact with the respective plate and the belt section thereon; means operable, when said closure members are in fluid-tight contact with the respective plates and belt sections thereon, to connect the interior of each closure member, except the last closure member, with a source of vacuum; and means operable, at the end of said time, to lift said closure members and to advance said belt conveyor by the distance between two successive tables; whereby skins may be charged on a belt section in advance of the first closure member and removed from the same belt section as the latter emerges from beneath the last closure member.

9. Apparatus as claimed in claim 8 in which the temperature of the tables and belt sections thereon is decreasing from the first to the last of said tables, and the vacuum in said closure members increasing from the first closure member to the last but one closure member, while under the last closure member there is no vacuum.

10. Apparatus, as claimed in claim 8, comprising hydraulic cylinders for conjointly lifting and lowering said closure members.

11. Apparatus, as claimed in claim 8, in which the intermittent advance of the conveyor belt and the timed lifting and lowering of the closure members are controlled by an automatic electromechanical control device including respective electric switch means which are operated by the closure members in their lifted and lowered positions, and electric switch means operated by abutments on said conveyor belt.

12. Apparatus, as claimed in claim 11, including an electric motor driving said endless conveyor and hydraulic cylinders conjointly lifting and lowering said closure members; and in which the said automatic control device comprises an electro-magnetically controlled distributing unit controlling the vacuum at the several stations; an electromagnetically-controlled distributing unit controlling the operating fluid of the hydraulic cylinders which lift and lower the several closure members; a distant control switch for said electric motor; and a timing unit including electromagnetic relays which determine the sequence of the various operations and the halt time of the conveyor belt between stepping thereof.

13. Machine for the drying of tanned skins and leather in several successive stations comprising a first charging and slicking out station, and a last station in which the treated leather pieces are removed, said machine comprising, in combination:
 a plurality of supporting plates made of a good heat-conductive material, and in correspondence with at least the intermediate stations, said supporting plates being substantially equal, equispaced and aligned; means for selectively heating and cooling said supporting plates;
 an endless multi-section belt conveyor made of thin good heat-conductive material, having an outer suitably smooth side adapted to support the skins to be treated, said belt conveyor being mounted with the inside surface of its upper run slidable in heat-exchange contact with said plurality of supporting plates;
 means driving said conveyor belt intermittently by such a length as to bring each belt section from each station to the subsequent one and halting each belt section at each station for a predetermined time;
 a number of covers mounted so as to be lifted away from and lowered upon the supporting plates after the first one and upon the respective belt sections, and provided with means for maintaining the leather pieces spread out upon the underlying endless belt sections; packing means provided under the edges of said covers for effecting a tight seal upon the respective supporting plates, in lowered position;
 means operable to lift and lower said covers;
 means operable to generate a vacuum under the covers, with the exception of the last one, when said covers are lowered with their packing engaged so as to effect a tight seal, and to remove the vacuum when said covers are again lifted; and
 means operable to halt the belt before lowering the covers and to advance the belt by a length which corresponds to the distance between two successive stations, after the lifting of said covers.

14. Machine according to claim 13, characterized by the feature that transversal grooves are formed in the supporting plates, in which packing strips are inserted which co-act with packing strips fastened under the corresponding edge parts of the cover.

15. Machine according to claim 13, characterized by an electric switch positioned along the path of travel of said conveyor belt and the provision of abutment members which project at predetermined adjustable intervals from the conveyor belt and are arranged to engage and operate said electric switch which, when operated by said abutment members, interrupts the operation of the conveyor belt-driving motor for a predetermined time, means being also provided to lower the covers and maintain the covers lowered until shortly before said belt is again started; and means operable to feed a heating fluid under the last closure member.

16. Process for vacuum drying wet tanned skins, hides, or like material, comprising the steps of: slicking out each of said skins upon a movable skin-supporting member, stepwise driving said skin-supporting member through an open closure member of the first of a set of chambers, then stopping said supporting member in said chamber and closing said closure members thereof, lowering upon the supporting member and the skins thereon an elastically-deformable air pervious layer; heating said supporting member from below and forming a vacuum in the chamber; removing the vacuum and opening the chamber; passing the supporting member with the skins thereon into at least one like succeeding chamber, subjecting the skins to a like heat treatment under vacuum in the succeeding chamber, and finally removing the skins from the respective supporting members.

References Cited

UNITED STATES PATENTS

| 1,009,881 | 11/1911 | Aelen | 34—15 |
| 1,106,271 | 8/1914 | Ayers | 34—162 |
| 1,106,272 | 8/1914 | Ayers | 34—162 |
| 2,197,776 | 4/1940 | Argabrite | 34—162 |
| 2,690,069 | 9/1954 | Kahn | 34—18 |
| 3,224,109 | 12/1965 | Turato | 34—92 |
| 3,253,351 | 5/1966 | Bettanin | 34—92 |

WILLIAM J. WYE, *Primary Examiner.*